United States Patent [19]

Job

[11] Patent Number: 5,141,910
[45] Date of Patent: Aug. 25, 1992

[54] OLEFIN POLYMERIZATION CATALYST

[75] Inventor: Robert C. Job, Houston, Tex.

[73] Assignee: Shell Oil Company, Houston, Tex.

[21] Appl. No.: 759,351

[22] Filed: Sep. 13, 1991

Related U.S. Application Data

[62] Division of Ser. No. 599,550, Oct. 18, 1990, Pat. No. 5,082,907.

[51] Int. Cl.$^5$ .............................................. C08F 4/653
[52] U.S. Cl. ................................. 502/127; 502/111; 502/125; 526/119
[58] Field of Search ..................... 502/125, 127, 111

[56] References Cited

U.S. PATENT DOCUMENTS

| | | | |
|---|---|---|---|
| 3,901,863 | 8/1975 | Berger et al. | 502/125 X |
| 4,170,482 | 12/1987 | Job | 502/127 |
| 4,330,649 | 5/1982 | Kioka et al. | 502/125 X |
| 4,472,521 | 9/1984 | Band | 502/104 |
| 4,540,679 | 9/1985 | Arzoumanidis et al. | 502/111 |
| 4,728,705 | 3/1988 | Nestlerode et al. | 526/125 |
| 4,902,761 | 2/1990 | Suga et al. | 502/125 X |
| 4,935,394 | 6/1990 | Chang | 502/127 X |
| 4,985,515 | 1/1991 | Matsuura et al. | 502/108 |

Primary Examiner—Patrick P. Garvin

[57] ABSTRACT

A complex alkoxide compond precursor of an olefin polymerization catalyst component is produced by contacting a magnesium alkoxide, a titanium alkoxide and a borate ester in alkanol solution. Akanol is removed from the resulting complex alkoxide compound alcoholate and the resulting product is contacted with tetravalent titanium halide, halohydrocarbon and an electron donor. The resulting solid olefin polymerization procatalyst is contacted with organoaluminum cocatalyst and a selectivity control agent. The resulting olefin polymerization catalyst affords polyolefin product in good productivity and with good stereospecificity.

26 Claims, No Drawings

OLEFIN POLYMERIZATION CATALYST

This is a division of application Ser. No. 07/599,550, filed Oct. 18, 1990, U.S. Pat. No. 5,082,907.

FIELD OF THE INVENTION

This invention relates to a high activity olefin polymerization catalyst, to a method for the production thereof and to chemical intermediates obtained in that process. More particularly, the invention relates to a magnesium-containing, titanium-containing complex alkoxide compound useful as a precursor of a catalyst component, and to the catalyst component and the catalyst produced from the complex alkoxide compound.

BACKGROUND OF THE INVENTION

The production of polymers and copolymers of lower α-olefins, particularly ethylene and propylene, has gained substantial commercial importance. The polymeric products are relatively inexpensive and exhibit a number of commercially useful properties. In the case of the polymerization of ethylene, the process is relatively uncomplicated in that the product type is not influenced by the manner in which the ethylene molecules add to the growing polymeric chain during polymerization and the polymeric product does not exist in stereoisomeric forms.

In the case of polypropylene, however, the presence of pendant methyl groups on the polymeric chain provides the possibility of several product types, depending on the steric regularity with which propylene molecules add to the growing chain. Much if not most of the commercial polypropylene results from the stereoregular addition of propylene molecules in a regular head-to-tail manner. The form of polymer having a substantial proportion of random addition of propylene units is termed atactic and this amorphous form is less desirable. If present in a significant proportion, the atactic polymer must be removed as through an extraction to provide the more desirable crystalline material. Also significant from a commercial standpoint is the activity of the polymerization catalyst. A number of the early polymerization catalysts, e.g., trivalent titanium, chromium or vanadium catalysts, were of a relatively low activity and the polymeric product contained significant proportions of catalyst residues. The removal of such residues as by a deashing step was required in order to obtain commercially satisfactory properties.

The more recent olefin polymerization catalysts, generally based on titanium, are more stereoregulating and of sufficient activity so that extraction and deashing steps are not required. In terms now employed conventionally, the high activity catalysts are formed from a solid procatalyst which typically contains magnesium, titanium and halide moieties, a cocatalyst which is usually an organoaluminum compound and a selectivity control agent which may be provided as a partial or total complex with the cocatalyst. Although each of these three components has a significant influence on the polymerization catalyst and process, as well as the polymer thereby produced, the nature of the catalyst and the polymer product appears to be most influenced by the procatalyst. Much of the research directed toward the improvement of olefin polymerization catalysts has been devoted to improvement of the procatalyst.

Kioka, et al, U.S. Pat. No. 4,330,649, describe a solid catalyst component (procatalyst) obtained by heating a soluble magnesium compound such as magnesium chloride with a higher alcohol in the presence of an ester to produce a solution. This solution is added to titanium tetrachloride and an electron donor to form the procatalyst. Band, U.S. Pat. No. 4,472,521, reacts a magnesium alkoxide, wherein each alkoxide has four or more carbons, in the presence of an aromatic hydrocarbon. Titanium tetrachloride and an electron donor are added to the resulting solution to form a solid procatalyst which is post-treated with transition metal halide. Arzoumanidis, U.S. Pat. No. 4,540,679, produces an olefin polymerization catalyst component by contacting a suspension of magnesium ethoxide in ethanol with carbon dioxide. The addition of organoaluminum in hydrocarbon results in the formation of granular particles which are employed as a support for a titanium compound upon contact with titanium tetrachloride. Nestlerode et al, U.S. Pat. No. 4,728,705, solubilize magnesium ethoxide in ethanol with carbon dioxide and spray dry the resulting solution or use the solution to impregnate carrier particles. The solid particles resulting from either modification are useful in the production of a procatalyst of desirable morphology.

A somewhat different process is described by Job, U.S. Pat. No. 4,710,428, wherein a magnesium compound of the general formula $$Mg_4(OR)_6(ROH)_{10}A \qquad (I)$$

is formed wherein R independently is lower alkyl and A is at least one anion having a total oxidation state of −2. This magnesium complex is reacted with a tetravalent titanium halide, a halohydrocarbon and an electron donor to form the procatalyst. The use of such magnesium compounds has certain advantages in that they are crystals of desirable morphology in contrast with magnesium ethoxide which is not. The crystals are converted to olefin polymerization procatalysts and thence to olefin polymerization catalysts by technology which is now largely conventional. The catalysts are high activity catalysts and are used to produce polyolefin having good properties. It would be of advantage, however, to produce improved procatalyst precursors and olefin polymerization catalysts whose use results in the production of polyolefin polymer of improved properties.

SUMMARY OF THE INVENTION

The present invention provides complex magnesium-containing, titanium-containing alkoxide compounds which are useful as precursors of high activity olefin polymerization catalysts and a process for the polymerization of lower α-olefins which employs such catalysts. More particularly, the present invention provides such complex alkoxide compounds as well as the olefin polymerization procatalysts and catalysts produced therefrom. Moreover, the invention provides processes for the production of the procatalysts and catalysts.

DESCRIPTION OF THE INVENTION

The present invention contemplates the formation of a complex magnesium-containing, titanium-containing alkoxide compound which is a precursor of the procatalyst component of a high activity olefin polymerization catalyst. Such complex alkoxide compounds are produced by contacting a magnesium alkoxide, a titanium alkoxide and a borate ester in an alkanol solution. Alkanol is removed from a solution of the resulting crystals in a hydrocarbon or halohydrocarbon to produce a clear solution from which an olefin proctalyst is formed. The procatalyst in turn is converted to an olefin polymerization catalyst.

The complex alkoxide compounds are produced from magnesium alkoxide wherein each alkoxide has up to 4 carbon atoms inclusive, titanium alkoxide wherein each alkoxide has up to 4 carbon atoms inclusive and a trialkylborate ester wherein each alkyl has up to 4 carbon atoms inclusive. The alkoxide moieties within each reactant are the same or are different and the alkoxide moieties of one reactant are the same or are different from alkoxide moieties of another reactant. Although alkoxide moieties such as methoxide, ethoxide, propoxide, i-propoxide, n-butoxide or i-butoxide are useful, the preferred alkoxide group is ethoxide. In part for reasons of product purity and ease of handling, it is preferred that all alkoxide groups are ethoxide.

The stoichiometry of the complex alkoxide compound is of the formula

$$Mg_3Ti_2(OR)_{14} \qquad (II)$$

wherein R independently is alkyl of up to 4 carbon atoms inclusive and is preferably ethyl.

The contacting of the magnesium, titanium and boron compounds takes place in an alkanol solution at an elevated temperature and at a pressure sufficient to maintain the reaction mixture in a non-gaseous state. The alkanol preferably but not necessarily corresponds to the alkoxide moieties of one or more of the reactants. Suitable reaction temperatures are from about 20° C. to about 180° C. but preferably are from about 50° C. to about 90° C. The contacting is conducted in a suitable reactor and is facilitated by conventional techniques such as shaking, stirring or refluxing. The stoichiometry of the reaction is illustrated by the partial equation, employing preferred ethoxide moieties

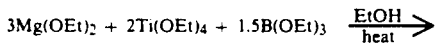

$$3Mg(OEt)_2 + 2Ti(OEt)_4 + 1.5B(OEt)_3 \xrightarrow[\text{heat}]{\text{EtOH}}$$

and the product, obtained as a crystalline alcoholate upon cooling of the product mixture, is illustrated by the formula

$$Mg_3Ti_2(OEt)_{14}\cdot n(EtOH) \qquad (III)$$

wherein n is a number from 0 to about 6. In the process of the invention it is required that trialkylborate be present even though boron does not appear in the crystalline product but remains in the mother liquor. The trialkylborate to be provided to the reaction mixture is a quantity from about 0.1 mole to about 2 moles per mole of titanium but preferably is a quantity from about 0.5 mole to about 1 mole per mole of titanium. The magnesium alkoxide is provided in a quantity from about 0.5 mole to about 4 moles per mole of titanium. Quantities of magnesium alkoxide from about 1 mole to about 2 moles per mole of titanium are preferred.

The resulting complex alkoxide compound alcoholate is a solid, crystalline material of low solubility in the medium of its production and is recovered from the product mixture by well known methods such as filtration or decantation. The alcoholate is converted to the complex alkoxide compound of the above formula II by removal of alkanol (ethanol in the preferred modification). Alkanol removal is by conventional procedures and generally involves the application of heat. A particularly satisfactory method for alkanol removal is by an azeotropic distillation with a hydrocarbon or halohydrocarbon solvent. Hydrocarbons and halohydrocarbons in which the complex alkoxide compound is soluble and with which the alkanol to be removed forms an azeotrope are useful for this purpose. An illustrative hydrocarbon is isooctane and an illustrative halohydrocarbon is chlorobenzene. The azeotropic solvent is typically added in a molar quantity in excess of the alkanol present and the resulting mixture is heated to remove alkanol. The complex alkoxide compound (Formula II) which results froms a clear solution in the excess hydrocarbon or halohydrocarbon at the boiling temperature of the azeotrope as well as upon cooling to ambient temperature.

The magnesium-containing, titanium-containing complex alkoxide compound is converted to an olefin polymerization catalyst by contacting with a tetravalent titanium halide, an optional halohydrocarbon and an electron donor. The tetravalent titanium halide is suitably an aryloxy-or an alkoxy-di- or trihalide such as diethoxytitanium chloride, dihexyloxytitanium bromide, isopropoxytitanium trichloride or phenoxytitanium trichloride or the tetravalent titanium halide is a titanium tetrahalide such as titanium tetrachloride or titanium tetrabromide. A titanium tetrahalide is preferred as the tetravalent titanium halide and particularly preferred is titanium tetrachloride.

The optional halohydrocarbon employed in the production of the olefin polymerization procatalyst is a halohydrocarbon of up to 12 carbon atoms inclusive, and preferably of up to 9 carbon atoms inclusive, which contains at least one halogen atom and in the case of aliphatic halohydrocarbons contains at least two halogen atoms. Exemplary aliphatic halohydrocarbons include methylene chloride, methylene bromide, chloroform, carbon tetrachloride, 1,2-dibromoethane, 1,1,3-trichloropropane, 1,1,2-trichloroethane, trichlorocyclohexane, dichlorofluoromethane and trichloroisooctane. Aromatic halohydrocarbons suitably employed include chlorobenzene, bromobenzene, dichlorobenzene and chlorotoluene. Of the aliphatic halohydrocarbons, carbon tetrachloride and 1,1,2-trichloroethane are preferred but particularly preferred is the aromatic halohydrocarbon chlorobenzene.

The electron donors which are suitably incorporated within the procatalyst are the generally conventional electron donors employed in titanium-based olefin polymerization procatalysts. Such electron donors are free from active hydrogens and include esters, ethers, ketones, amines, imines, amides, nitriles, phosphines, stibines, arsines and alcoholates. The preferred electron donors are esters and particularly alkyl esters of aromatic monocarboxylic and dicarboxylic acids. Illustrative of the preferred electron donors are methyl benzoate, ethyl benzoate, ethyl p-ethoxybenzoate, ethyl p-methylbenzoate, diisobutyl phthalate, dimethyl naphthalenedicarboxylate and diisopropyl terephthalate. The electron donor is usefully a single compound or is a mixture of compounds but preferably the electron donor is a single compound. Of the preferred ester electron donors, ethyl benzoate and diisobutyl phthalate are particularly preferred.

The manner by which the complex alkoxide compound, the tetravalent titanium halide, the halohydrocarbon and the electron donor are contacted is material but is not critical. Best results are obtained if the electron donor is added to the complex alkoxide compound and the resulting mixture is added to at least a portion of the tetravalent titanium halide. Alternatively, however, the tetravalent titanium halide is added to a mixture of the complex alkoxide compound and the electron donor. Other modifications of the procedure are suitable but less preferred. The resulting granular solid is typically washed with a 50/50 mixture by volume of additional tetravalent titanium halide and halohydrocarbon at least once and often twice or even more times. This washing process, often termed a halogenation, is frequently aided by the additional presence of an acid halide, particularly an aromatic acid halide such as benzoyl chloride or phthaloyl chloride, as is known in the art. Subsequent to the contacting with tetravalent titanium halide and halohydrocarbon, the solid procatalyst product is washed with light hydrocarbon, e.g., isooctane or isopentane, and is dried. The procatalyst is storage-stable in the absence of oxygen and active hydrogen compounds but may be used directly as produced without drying in the production of high activity olefin polymerization catalysts by reaction with cocatalyst and selectivity control agent.

The cocatalyst is an organoaluminum compound selected from the alkylaluminum compounds conventionally employed as cocatalysts in the production of titanium-based olefin polymerization catalysts. Suitable alkylaluminum compounds are trialkylaluminum compounds, alkylaluminum halide compounds or alkylaluminum alkoxide compounds wherein each alkyl independently has from 2 to 6 carbon atoms. The preferred alkylaluminum compounds are free from halide moieties and particularly preferred are trialkylaluminum compounds such as triethylaluminum, triisobutylaluminum, tri-n-propylaluminum and diethylhexylaluminum. Triethylaluminum is the preferred member of the class of trialkylaluminum compounds. The organoaluminum cocatalyst is employed in sufficient quantity to provide from about 1 mole to about 150 moles of aluminum per mole of titanium of the procatalyst. Preferred quantities of cocatalyst are sufficient to provide from about 10 moles to about 100 moles of aluminum per mole of titanium.

The selectivity control agents which are employed in the production of the high activity olefin polymerization catalysts of the invention are those conventionally utilized in olefin polymerization catalysts based on titanium. Suitable selectivity control agents are electron donors such as those listed above for use in procatalyst production but suitable selectivity control agents also include organosilane compounds including alkylalkoxysilane compounds and arylalkoxysilane compounds of the formula

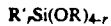 (IV)

wherein R' independently is alkyl or aryl of up to 10 carbon atoms inclusive, R independently is alkyl of up to 4 carbon atoms inclusive and r is 1 or 2. The preferred selectivity control agents are esters of aromatic acids such as ethyl p-ethoxybenzoate, diisobutyl phthalate, ethyl benzoate and ethyl p-methylbenzoate or are alkylalkoxysilanes such as diisobutyldimethoxysilane, isopropyltrimethoxysilane and cyclohexylmethyldimethoxysilane. The selectivity control agent is provided in a quantity of from about 0.01 mole to about 100 moles per mole of titanium of the procatalyst but preferably in a quantity of from about 0.5 mole to about 20 mole per mole of titanium.

The components of the high activity olefin polymerization catalyst are contacted by methods that are largely conventional. In one modification, the components are contacted outside the polymerization as by mixing the components and introducing the performed catalyst thereby produced into the olefin polymerization reactor. In an alternate modification, the catalyst components are introduced separately into the polymerization reactor where the olefin polymerization catalyst is formed in situ. The olefin polymerization catalyst as formed from the complex alkoxide compound procatalyst precursor is useful in the polymerization of lower α-olefins under polymerization conditions and particularly in the polymerization of straight-chain α-olefins of up to 4 carbon atoms inclusive, i.e., ethylene, propylene and 1-butene. The precise procedures of the polymerization are broadly conventional but the olefin polymerization process of the invention, by virtue of its use of a catalyst formed from the complex alkoxide compound, provides polyolefin product having a relatively high bulk density in quantities which reflect the relatively high productivity of the olefin polymerization catalyst. The polymerization product is suitably a homopolymer, e.g., polyethylene or polypropylene, as when a single α-olefin monomer is supplied to the polymerization process. Alternatively, the polymerization process is useful in the production of copolymer such as ethylene-propylene rubber or polypropylene impact copolymer as when two or even more α-olefin monomers are employed in the polymerization process.

The polymerization process is conducted as a gas-phase process employing one or more fluidized beds of catalyst or is conducted as a slurry-phase process incorporating as a diluent an inert material such as propane or a liquified monomer of the polymerization process such as propylene. The molecular weight of the polymer product and thus to some extent the properties of the product are suitably influenced by the provision to the polymerization system of molecular hydrogen as is known in the art. The polymerization is conducted in a batchwise manner or in a continuous or semi-continuous manner by constant or by intermittent addition of the catalyst or catalyst components and/or olefin monomer to the polymerization reactor.

The catalyst productivity often exhibits an inverse relationship with selectivity so that highly productive (active) catalysts often afford polymer product of low stereoregularity. The catalysts of the invention exhibit good productivity while retaining a desirably high stereospecificity. The activity and the stereospecificity of the catalyst of the invention are sufficiently high so that polymer is obtained in good yield and with properties sufficiently good that extraction and deashing steps are not required.

The invention is further illustrated by the following Illustrative Embodiments which should not be regarded as limiting. In the Illustrative Embodiments the productivity of the catalyst is determined as kilograms of polymer product per gram of procatalyst in a standard batch polymerization of 1 hour or alternatively the productivity is expressed in kilograms of polymer product per gram of titanium as determined in similar fashion. The stereospecificity of the catalyst and specifically the selectivity to isotactic product is determined by measuring the amount of xylene soluble polymer (termed XS)

in accordance with regulations of the U.S. Food and Drug Administration. The test for xylene solubles is conducted by dissolving the polymer sample in xylene under reflux in a flask. The flask is then immersed in a water bath at 25° C. without stirring for 1 hour, during which the insoluble proportion precipitates. The precipitate is removed by filtration and the solubles content is determined by evaporating an aliquot of the filgrate followed by drying and weighing of the residue. The xylene solubles consist primarily of amorphous (atactic) polymer with a small amount of low molecular weight crystalline polymer.

ILLUSTRATIVE EMBODIMENT I

Magnesium ethoxide (10 g, 87 mmol), titanium ethoxide (10 g of 95%, 43.5 mmol) and triethylborate (6.4 g, 43.8 mmol) were stirred in 44.4 g of ethanol in a 100° C. oil bath. After about an hour, a clear solution was obtained but upon cooling to room temperature a crystalline precipitate formed which became sticky upon washing with isooctane. The solid was collected on a frit and dried under flowing nitrogen. Granular crystals, 7.7 g, were obtained having a size in the 15–50 micron range. These crystals were placed in 150 ml of isooctane and dissolved and cooled overnight. The addition of 50 ml of ethanol produced 5.2 g of a crystalline precipitate.

ILLUSTRATIVE EMBODIMENT II

The procedure of Illustrative Embodiment I was repeated with 15 g (131 mmol) of magnesium ethoxide, 15 g (66 mmol) of titanium ethoxide, and 33.3 g of ethanol but no triethylborate. Overnight stirring, the addition of an additional 33.3 g of ethanol and heating for 1 hour did not produce a solution. Triethylborate (9.6 g, 66 mmol) was added and a clear solution was obtained after a few minutes heating on a 100° C. oil bath. The solution was then cooled to room temperature while being stirred and a precipitate resulted. This precipitate was collected by filtration, washed with ethanol and dried under flowing nitrogen. Transparent rhombic crystals, 20.8 g, were obtained. Analysis: 5.70% Mg, 10.6% Ti, 0.4% B.

ILLUSTRATIVE EMBODIMENT III

Magnesium ethoxide (15 g, 131 mmol) and titanium tetraisopropoxide (18.8 g, 66 mmol) were stirred in 62 g of ethanol while being heated in a 100° C. oil bath. After 2 hours, 4.8 g (33 mmol) of triethylborate was added to the white slurry to form a clear solution. Upon cooling to room temperature, a crystalline precipitate formed. The solids were collected by filtration, rinsed once with ethanol and dried under flowing nitrogen. Crystalline granules, 27.0 g, were obtained. Analysis: 6.41% Mg, 10.56% Ti, 0.7% B.

ILLUSTRATIVE EMBODIMENT IV

Magnesium ethoxide (60 g, 524 mmol) and titanium tetraisopropoxide (78.2 g, 275 mmol) were slurried overnight in the absence of solvent while heated in a 130° C. oil bath. The resulting grey slush was slurried with 168 g of ethanol and 18.9 (130 mmol) triethylborate. Upon heating in a 100° C. oil bath for 2 hours, a nearly clear solution resulted. After cooling overnight, a precipitate formed which was collected, washed with ethanol and dried quickly under flowing nitrogen to yield 160 g of a moist powder.

ILLUSTRATIVE EMBODIMENT V

In a 3 liter flask were slurried 188 g (1.64 mole) of magnesium ethoxide, 312 g (1.1 mole) of titanium tetraisopropoxide, 572 g of ethanol and 447 g of a 3% solution of $Mg(OEt)_2.1.2B(OEt)_3$ in ethanol (0.55 mole Mg, 0.66 mol B). After stirring overnight at a pot temperature of 70° C., the cloudy solution was cooled to produce a precipitate. The precipitate was collected by filtration, rinsed once with ethanol and dried briefly under flowing nitrogen to produce about 600 g of a moist, crystalline solid.

ILLUSTRATIVE EMBODIMENT VI

Rhombic crystals (37.8 g) prepared according to the procedure of Illustrative Embodiment II were slurried into 170 g of chlorobenzene and then boiled to a weight of 50 g. The resulting solution was clear and stable.

ILLUSTRATIVE EMBODIMENT VII

The ethanol-moist powder (160 g) prepared according to the procedure of Illustrative Embodiment IV was slurried in about 500 g of isooctane and the resulting solution was boiled down to a weight of 319 g. The resulting slightly cloudy solution was then filtered through a medium porosity frit to produce a clear solution with a magnesium content of about 3%.

ILLUSTRATIVE EMBODIMENT VIII

The 600 g of ethanol-moist powder produced according to the procedures of Illustrative Embodiment V was slurried in about 1800 ml of isooctane. The resulting mixture was distilled at a head temperature of from about 69° C. to about 93° C. until about 1600 ml of solvent were collected. The slightly cloudy solution was then filtered through a medium porosity frit to produce 963 g of a clear solution. Analysis: Mg=1.24 mmol/ml, Ti=0.835 mol/ml, B=less than 0.1 mmol/ml.

ILLUSTRATIVE EMBODIMENT IX

Procatalysts were produced from the solutions of Illustrative Embodiments VI–VIII by employing a digest at 110° C. for 60 minutes in 150 ml of titanium tetrachloride utilizing a mixture of such a solution sufficient to provide 30–50 mmol magnesium and sufficient diisobutyl phthalate to provide a concentration of about 40 mmol/liter. The resulting product was washed at 110° C. with 150 ml of a 50/50 by volume mixture of chlorobenzene and titanium tetrachloride containing 6 mmol/liter of phthaloyl chloride. This was followed by a 30 minute wash at 110° C. with the 50/50 mixture. The resulting solid was washed twice with isooctane at room temperature and dried under nitrogen at 50° C.

The combining of the magnesium-containing solution and the first wash solution was conducted by one of two methods described as follows.

A. Diisobutyl phthalate was added to the magnesium-containing solution and the mixture which resulted was added dropwise to 150 ml of rapidly stirred titanium tetrachloride mixture at room temperature. After 20 minutes, the temperature of the resulting mixture was raised to 110° C. for the remainder of the digest period.

B. Same as A, except the diisobutyl phthalate and the magnesium-containing solution were held overnight at room temperature before being added to the titanium tetrachloride solution.

ILLUSTRATIVE EMBODIMENT X

Polymerization catalysts were prepared from the procatalysts produced according to the procedure of Illustrative Embodiment IX employing the solutions of Illustrative Embodiments VI-VIII. Triethylaluminum was used as cocatalyst and diisobutyl phthalate as selectivity control agent. Using these catalysts, propylene was polymerized in a slurry-phase process using liquid propylene as diluent. The results of the polymerization in terms of catalyst productivity and polypropylene properties are shown in the Table where "Source" is the Illustrative Embodiment whose procedure was used to produce the complex alkoxide solution and "Procedure" indicates the method of Illustrative Embodiment IX by which the procatalyst was formed. Also shown are the results of employing a catalyst whose procatalyst is formed from magnesium ethoxide rather than the complex alkoxide compound of the invention.

TABLE

| Run | Source | Procedure | Ti in Catalyst, % | Yield, Kg PP/g % | XS, % | B.D. (g/cc) |
|---|---|---|---|---|---|---|
| 1 | Mg(OEt)$_2$ | — | 2.28 | 26.6 | 2.7 | 0.33 |
| 2 | VII | B | 2.43 | 26.1 | 3.5 | 0.363 |
| 3 | VI | B | 2.42 | 30.8 | 3.5 | 0.38 |
| 4 | VII | B | 2.34 | 31.2 | 3.6 | 0.374 |

What is claimed is:

1. A magnesium-containing, titanium-containing complex alkoxide compound obtained by contacting magnesium alkoxide wherein each alkoxide has up to 4 carbon atoms inclusive, titanium alkoxide wherein each alkoxide has up to 4 carbon atoms inclusive, and trialkyl borate ester wherein each alkyl has up to 4 carbon atoms inclusive, in alkanol at temperature in the range from about 20° C. to about 180° C. and removing alkanol from the resulting complex alkoxide compound alcoholate.

2. The complex alkoxide compound of claim 1 of the formula $$Mg_3Ti_2(OR)_{14}$$

wherein R independently is alkyl of up to 4 carbon atoms inclusive.

3. The solid olefin polymerization catalyst component obtained by contacting a tetravalent titanium halide, a halohydrocarbon, an electron donor and the complex alkoxide compound of claim 1.

4. The solid component of claim 3 wherein the tetravalent titanium halide is titanium tetrahalide.

5. The solid component of claim 4 wherein the electron donor is an ester of an aromatic monocarboxylic or dicarboxylic acid.

6. The solid component of claim 5 wherein the halohydrocarbon is halohydrocarbon of up to 12 carbon atoms inclusive containing at least one halogen atom and which, if aliphatic, contains at least two halogen atoms.

7. The solid component of claim 6 wherein the complex alkoxide compound is of the formula $$Mg_3Ti_2(OR)_{14}$$

wherein R independently is alkyl of up to 4 carbon atoms inclusive.

8. The solid component of claim 7 wherein the titanium tetrahalide is titanium tetrachloride.

9. The solid component of claim 8 wherein the halohydrocarbon is chlorobenzene.

10. The solid component of claim 9 wherein the ester is ethyl benzoate or diisobutyl phthalate.

11. The solid component of claim 10 wherein the ester is diisobutyl phthalate.

12. A high activity olefin polymerization catalyst produced by contacting the solid catalyst component of claim 3, an organoaluminum cocatalyst and a selectivity control agent.

13. The catalyst of claim 12 wherein the organoaluminum compound is trialkylaluminum.

14. The catalyst of claim 13 wherein the selectivity control agent is an ester of an aromatic monocarboxylic acid or dicarboxylic acid or the alkylalkoxysilane of the formula $$R'_rSi(OR)_{4-r}$$

wherein R' independently is alkyl or aryl of up to 10 carbon atoms inclusive, R independently is alkyl of up to 4 carbon atoms inclusive and r is 1 or 2.

15. The catalyst of claim 14 wherein the complex alkoxide compound is of the formula $$Mg_3Ti_2(OR)_{14}$$

wherein R independently has up to 4 carbon atoms.

16. The catalyst of claim 15 wherein the tetravalent titanium halide is titanium tetrachloride.

17. The catalyst of claim 16 wherein the halohydrocarbon is chlorobenzene.

18. The catalyst of claim 16 wherein the electron donor is an ester of an aromatic monocarboxylic or dicarboxylic acid.

19. The catalyst of claim 18 wherein the electron donor is ethyl benzoate or diisobutyl phthalate.

20. The catalyst of claim 18 wherein the trialkylaluminum compound is triethylaluminum.

21. The catalyst of claim 20 wherein the selectivity control compound is an ester.

22. The catalyst of claim 21 wherein the selectivity control agent is ethyl p-ethoxybenzoate, diisobutyl phthalate, ethyl benzoate or p-methylbenzoate.

23. The catalyst of claim 22 wherein the selectivity control agent is ethyl p-ethoxybenzoate.

24. The catalyst of claim 22 wherein the selectivity control agent is diisobutyl phthalate.

25. The catalyst of claim 20 wherein the selectivity control agent is alkylalkoxysilane.

26. The catalyst of claim 25 wherein the alkylalkoxysilane is diisobutyldimethoxysilane, isopropyltrimethoxysilane or cyclohexylmethyldimethoxysilane.

* * * * *